United States Patent [19]

Feichtinger et al.

[11] Patent Number: 5,094,699
[45] Date of Patent: Mar. 10, 1992

[54] METHOD OF PRODUCING A HIGH STRENGTH AND HARD METALLIC COMPOSITE LAYER MATERIAL

[75] Inventors: Heinrich K. Feichtinger, Hinteregg; Gerald Stein, Essen; Marcus O. Speidel, Birnenstorf; Joachim Menzel, Essen, all of Fed. Rep. of Germany

[73] Assignee: Vereinigte Schmiedewerke GmbH, Osnabruck, Fed. Rep. of Germany

[21] Appl. No.: 482,219

[22] Filed: Feb. 20, 1990

[30] Foreign Application Priority Data

Feb. 17, 1989 [DE] Fed. Rep. of Germany ....... 3904776

[51] Int. Cl.$^5$ .................... C21D 8/00; B23J 20/24
[52] U.S. Cl. .................... 148/12.1; 148/11.5 R; 148/16; 148/16.5; 148/16.6; 148/16.7; 228/231; 228/263.15
[58] Field of Search .............. 148/16.5, 16.6, 12.1, 148/279, 11.5 Q, 16, 16.7, 20.3; 228/231, 261.15

[56] References Cited

U.S. PATENT DOCUMENTS 1,950,549  3/1934  Fry et al. ........... 148/12.1
2,881,109  4/1959  Thorn et al. ........ 148/12.1

FOREIGN PATENT DOCUMENTS 63-227790  9/1988  Japan .................. 148/16.6
282038     5/1977  U.S.S.R. .............. 228/203

OTHER PUBLICATIONS

Metals Handbook, 9th ed. vol. 6, p. 9 1983.

Primary Examiner—H. Dean
Assistant Examiner—Margery S. Phipps
Attorney, Agent, or Firm—Michael J. Striker

[57] ABSTRACT

A method of manufacturing high strength and hard metallic composite layer materials by connecting several metal layers with one another, includes forming the metal layers as flat products by rolling from a metal with low base strength, alloying and hardening the flat products over their whole cross-section with a metalloid by heat treatment in a metalloid containing gas atmosphere, then connecting the flat products with one another by diffusion welding. As metalloids preferably nitrogen, boron and carbon are used. Diffusion welding is performed by hot isostatic pressure method.

10 Claims, 2 Drawing Sheets 5,094,699

METHOD OF PRODUCING A HIGH STRENGTH AND HARD METALLIC COMPOSITE LAYER MATERIAL

BACKGROUND OF THE INVENTION

The present invention relates to a method producing a high strength and hard metallic composite layer material which is composed of several metal layers connected with one another by diffusion welding.

Metallic composite layer materials are composed of two or more metal layers which are connected with one another and identified as components. The components predominant in volume or weight are identified as base or backing material, while the remaining components depending on their position and arrangement are identified as plating, supporting, inserting or intermediate material.

The combination of suitable metals and alloys in connection with the selection of suitable layer thicknesses and the relative position of the components in a composite provides for a possibility of producing of almost unlimited number of composite layer materials with defined physical, chemical and technological properties.

Typical examples of composite layer materials are unalloyed and low alloyed steel which for the corrosion protection are "plated" with protective layers of corrosion and heat resistant steels, non-ferrous metals and noble metals which at high chemical, mechanical and thermal stresses are used as correspondingly strongly dimensioned structural elements of steel, non-ferrous metals or noble metals in an efficient way.

The inexpensive base material of unalloyed or low alloyed steel takes up the mechanical loading, while the chemical/thermal loading is taken by the plating material.

The metallic composite layer materials are mainly produced by processes in which the individual metal layers are connected in a solid phase with one another under increased temperature by pressure, and each layer component maintains its original properties. Such processes include pressure welding, roller plating and explosion plating. More recently the hot isostatic pressing (HIP-process) is used for producing of metallic composite layer materials especially for complicated shaped structural elements. During this process the metal components are surrounded by a gas-tight deformable sleeve, and at temperatures selected so high that a sufficient diffusion of the components in one another can occur, are connected with one another by gases acting through the outer wall of the sleeve under pressure, by diffusion welding.

The strength value tensile strength, yielding point) of a structural element of metallic composite layer materials is obtained additively from the respective values of the individual layer components. When a metallic composite layer material, for example of several steel layers of high strength (greater than 1,500 and up to 2,500 N/mm pulling strength) is produced, the individual steel layers have this value before the diffusion welding.

There is a great number of "highest strength" steels which possess such a strength due to their alloy content of strength-increasing elements, such as chromium, nickel, cobalt, molybdenum or also nitrogen in raw condition. These steels are however difficult to deform, especially by rolling to thin sizes, such as sheets or bands, for use as layer components. They have a high form change resistance which under the action of high deformation degrees increases further and therefore significantly reduces the possibilities of deformation. Special precautionary measures must be taken during rolling of such steels, for example rolling in several heating stages with maintaining very narrow limited deformation temperatures, to roll such high strength steels to thin sizes. These processes of producing layer components made of steel, are not economical.

A further possibility to use high strength layer components made of steel for forming a composite layer material is to roll steels with a basic composition insuring a good workability to flat products, and then to raise their strength either by a combined hardening tempering treatment producing a martensite structure or by a precipitation hardening treatment by which intermetallic compounds, like carbides nitrides, etc precipitate and harden the steel.

The thusly expanded strength properties were again restored during subsequent connection of the thusly treated steel layer components to a composite body at high temperatures up to 1,300° C. required for diffusion welding.

SUMMARY OF THE INVENTION

Accordingly, proceeding from the above discussed prior art, it is an object of the present invention to provide a method of producing a high strength metallic composite layer material of several metal layers which are connected with one another by diffusion welding, in which by a simple and efficient manner strength of each of the metal layers which determine the total strength of the composite material is adjusted to the desired value and maintained during connecting said layers by diffusion welding.

In keeping with these objects and with others which will become apparent hereinafter, one feature of the present invention resides, briefly stated, in a method in accordance with which the metal layers are flat products rolled from a metal with low base strength, which prior to the diffusion welding are alloyed and hardened over the whole cross section with a metalloid by a thermal treatment in a metalloid containing gas atmosphere.

Such a hardening of metal layers used for formation of a composite layer body by alloying with a metalloid, such as nitrogen, boron and carbon is suitable especially for producing of high strength composite layer materials of several steel layers. For producing the individual steel layers, first steels with low strength determined by their base composition as the extended end strength with sufficient deformation properties are rolled to flat products with a thickness of only several millimeters, for example in form of sheets or bands. The flat products are then subjected to a thermal treatment in a gas atmosphere which contains a suitable metalloid, for example nitrogen. During this treatment, the metalloid diffuses into the base material, where it goes interstitially in solution and/or forms compositions with the alloying elements contained in steel. Thereby the strength of the base material is increased.

Depending on the temperature and duration of the thermal treatment as well as the content of the alloying elements and the structure formation of the steel and also in dependence on the metalloid content of the gas atmosphere, predetermined content of metalloid in the base material can be produced in a desired manner and desired strength values can be adjusted.

Thermal treatment can be performed so that it produces a constant metalloid concentration continuously through the whole cross-section of the flat product so as to provide identical strength values through cross-section of the flat product.

It is also possible, however, to produce a concentration profile which decreases from the surfaces to the interior of the flat product. This concentration profile with a high metalloid content on the edge and a lower metalloid content in the interior of the flat product leads after the diffusion welding of the flat product to a composite layer material with periodical concentration profile of the metalloid. As seen over the cross-section of the composite material, reduction and again increase of mechanical properties are produced. It is possible that high strength with low strength or high strength With high hardness zones are provided in alternating order, whereby with a predetermined total strength of the composite body its hardness is increased.

The inventive method is of course not limited to the manufacture of flat products using the composite layer materials of the same material. The flat products can be selected from different materials, for example, from steels of different base compositions, which in connection with the alloying of the metalloid can lead to special properties with respect to the mechanical conditions or corrosion properties. For this purpose the flat products can be diffusion welded in a series arrangement, which corresponds to the later loading of the workpiece in an optimal manner. It is also possible to diffusion weld flat products of different thicknesses with one another. Depending on the metalloid contents of the flat product over the cross-section of the final composite layer material, different workpiece properties corresponding to the applications are adjustable.

For alloying of flat products, especially flat products composed of steel, advantageous process parameters must be selected. During alloying with nitrogen, a gas atmosphere of nitrogen and hydrogen used, preferably in form of forming gas (92% nitrogen, 8% hydrogen) or an ammonia/nitrogen/hydrogen mixture is used.

In accordance with this feature of the present invention the alloying includes using nitrogen as the metalloid and introducing the nitrogen by a nitriting treatment in a nitrogen containing gas atmosphere at temperatures of 500°-1,300° C. over a time of 0.5-30 hours to a content of 0.1-3.0 weight nitrogen in the flat products, whereby in case the nitrogen contents of the flat products exceed the nitrogen solubility of the respective metal, the gas atmosphere is maintained in a pressure and under an excess pressure up to 300 bar.

In accordance with the invention, the alloying can include using boron as the metalloid, and introducing boron in a boron-halides containing gas atmosphere at 800°-1,100° C. over a time of 0.1-15 hours to a content of 0.02-0.20 weight percent boron into the flat products.

Still further, the alloying includes using carbon as metalloid, and introducing carbon in a CO and/or $CH_4$ containing atmosphere over a time of 0.5-50 hours at temperatures of 800°-1,300° C. to a content of 0.1-2.0 weight percent into the flat products.

The flat products alloyed with the metalloid are preferably diffusion welded with one another by the process of the hot isostatic pressing (HIP-process) to a compact metallic composite layer body. For insuring an unobjectionable diffusion welding of the individual layer components the flat products prior to the hot isostatic pressing are welded with one another on their contact edges in a gas tight manner, to prevent a pressure build up between the components to be connected during the pressing. For avoiding possible oxidation phenomenon of the outer surfaces of the flat products during hot isostatic pressing, the dead volumes remaining between the flat products and the dead volumes of the sleeve which surrounds the flat products, during a hot isostatic pressing are filled with a protective gas prior to the hot isostatic pressing.

A gas dissolving in the workpiece during the hot isostatic pressure process and being identical to the gas used for introducing the metalloid in the flat product is suitable as such a protective gas. Instead of filling with the protective gas, the dead volumes can be evacuated for avoiding the above mentioned oxidation phenomenon.

Instead of the hot isostatic pressing, also for dimensioning of the flat product package, a forging or rolling process can be used. Care should be taken that the surfaces of flat products to be connected by diffusion welding are blank. This can be achieved by evacuation or by filling of the dead volumes with protective gases which under condition of the welding process are soluble in the material.

The invention method is especially suitable for producing high strength cylinder shaped metallic ring bodies in composite layer.

In the inventive method utilized for manufacturing high strength cylindrical metallic ring bodies to form a composite layer structure, the metal layers are formed of a metal band of small thickness coiled from a metal with low strength. The alloying includes alloying the metal band with a metalloid to the desired strength by a thermal treatment in a metalloid containing gas atmosphere, then winding the metal band to a coil corresponding to contours of the ring bodies. Then the diffusion welding is performed by diffusion welding of the windings of the coil hot isostatically with one another to form the ring body.

Especially advantageous is the utilization of the inventive method for producing of high strength chromium-manganese-steel-retaining rings for generators. The inventive method is especially suitable for manufacture of high strength chromium-manganese-steel retaining rings for generators, wherein a steel is used with the the following content:

| | |
|---|---|
| carbon | max 0.12 weight percent |
| silicium | 0.2-1.0 weight percent |
| manganese | 17.5-20.5 weight percent |
| chromium | 17.5-20.5 weight percent |
| nickel | max 1.0 weight percent |
| nitrogen | max 0.6 weight percent. |

From said steel a steel band of 2-5 mm thickness with a strength of 720-830 $N/mm^2$ is rolled. Steel band is alloyed by a heat treatment in nitrogen containing atmosphere with 0.6-1.5 weight percent nitrogen to with the strength value of the steel band to 800-2,000 $N/mm^2$. The steel band then wound to a coil corresponding to end contours of the retainer ring. Then windings of the coil are compressed hot isostatically with one another to form a compact high strength retaining ring.

Retaining rings which on the turbogenerators hold the coil heads from inertia forces produced during the rotary movement of the rotor, were exclusively produced of non-magnetisable steels by forging. The manufacturing process is very expensive due to many working steps required for this. A pre-block produced by the electro slag melting process is first forged. Then, the partial weight (bleb) required for a respective retaining ring is knocked down, reheated, upset and perforated. The forging process is interrupted for intermediate cleaning and guided in two further heatings by longitudinal forging, retaining and rolling to the end. After size and surface control, a tip removing treatment is performed. For obtaining the required strength the pre-worked retaining rings are cold hardened by expanding under a hydraulic press, annealed in stress free manner for removing stresses produced during expansion, and finally subjected to final working to the delivery size.

The method of producing retaining rings in accordance with the present invention has significant advantages over the conventional methods. The band can be rolled from a conventionally cast block or from continuously casted material. A ESU melting is no longer necessary.

The forging and perforation connected with the intermediate heating and at least one intermediate working are dispensed with. The width of the steel band can be preliminarily selected so that its width corresponds to the ring height of the retaining ring. Therefore, after winding of the steel band to a coil with a corresponding inner and outer diameter, the end contours of the retaining ring are produced with near net shape.

The inventive process provides for the manufacture of a retaining ring with high strength without cold expansion. The anisotropy of the material values obtained during the conventional processes after the cold expansion over the width of the retaining ring is eliminated in the inventive process. In the conventional process during expanding of ring, the deformation degree of the wall inside is greater than outside, which leads to higher cold hardening and thereby higher 0.2 expansion limit than outside. The steel band in the applicants' invention which is nitrogenized during the preliminary heat treatment has completely uniform strength properties due to the used nitrogen contents. These strength properties are also maintained over the width of the ring after winding to a coil and subsequent hot isostatic pressing of the coil windings to form a compact retaining ring. A cold expansion is only required when in the final retaining ring extremely high strengths are needed, which cannot be obtained only by the nitrogen treatment.

It is to be understood that bodies with a geometry other than rings can be produced in a "Near Net Shape Technique". This can be done in that a series of individually shaped and mutually corresponding flat products can be assembled to a composite body, to produce a three-dimensional body with desired sizes. The base material, the thickness and the content of metalloids for each flat product are selected so that as a whole, a body with optimal properties for its utilization produced. For example, a high temperature resistant body is produced so that its inner layers are composed of an alternating sequence of high strength sheets with stable nitrides and high ductile sheets with homogeneously dissolved nitrogen content. The workpiece produced in this manner is hardened by the introduced nitrogen-containing layers, while the high ductile intermediate layers serve as fracture stoppers. It is to be understood that a cover layer as a closure of these inner layers can be used. They can have a special corrosion resistance.

BRIEF DESCRIPTION OF THE DRAWINGS

FIG. 1b shows a nitrogen profile over the cross-section of FIG. 1a;

FIG. 2b shows a nitrogen profile over the cross-section of FIG. 2a;

DESCRIPTION OF THE SPECIFIC EXAMPLES

Figure 1A:
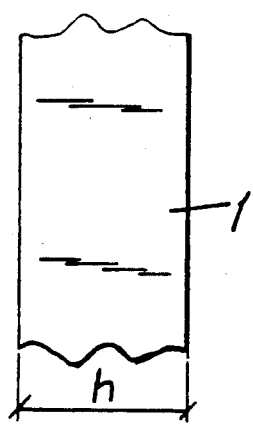
FIG. 1a shows a cross-section of a metal flat product.
Figure 1B:
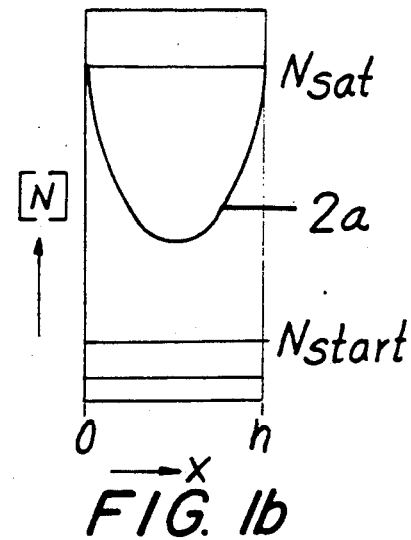

FIG. 1 shows a cross-section of a metal flat product 1a with a thickness h. FIG. 1b shows nitrogen profile 2a produced after a predetermined diffusion time during a heat treatment of the flat product in a nitrogen containing atmosphere over the cross-section, starting from initial nitrogen content $N_{start}$ in direction to the saturation content $N_{sat}$. The diffusion process can be performed so long until the whole cross-section of the flat product is practically located on the saturation value.

Figure 2A:
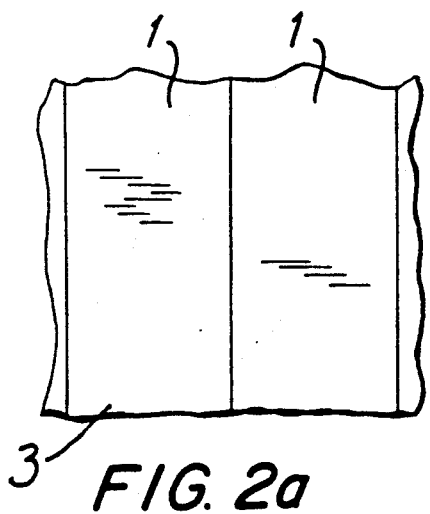
FIG. 2a shows the joining of two flat products to a composite article.
Figure 2B:
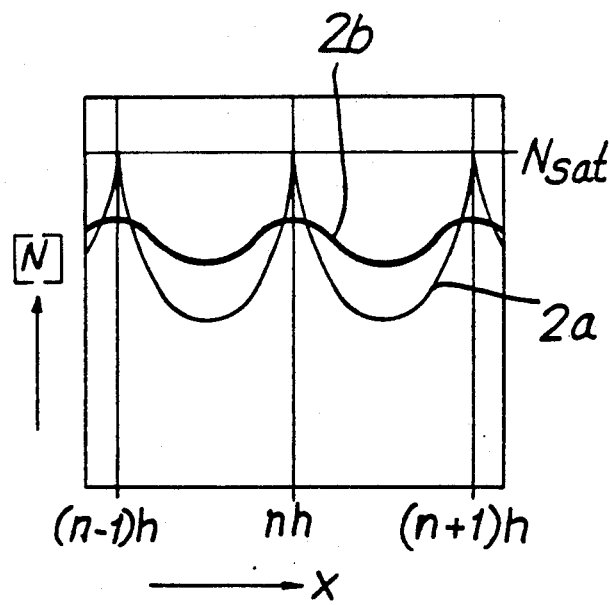

FIG. 2a shows the joining of two flat products 1 to a composite piece 3. The contact surfaces of both flat products must have as good contact as possible so that the diffusion welding can be performed in an optimal manner. The diffusion welding which can be performed by means of a forging process or a hot isostatic pressing process, leads to a nitrogen concentration profile shown in FIG. 2b. During the welding process a gradual flattening of the original concentration profile 2a to a softer profile 2b occurs. If the sheets preliminarily had the full saturation concentration, then naturally the composite material produced from them has a continuously homogeneous nitrogen concentration.

In many cases it is advantageous when the nitrogen content is not brought to the saturation, since in this manner a gradient material is produced with a periodical nitrogen concentration over the sheet thickness and therefore with local mechanical properties. In this case, for example high strength zones with low strength zones or high ductile zones with low ductile zones are arranged in alternating order.

For the compacting or joining process of the flat products, any process can be utilized with which it comes to a diffusion welding. Especially hot isostatic pressing and forging can be suitable for this purpose. Since during hot isostatic pressing a pressure build up must be prevented between the profiles to be connected, the profiles must be connected with one another in a gas tight manner. During forging the cleanliness of the joining surfaces is required for preventing for example oxidation phenomenon.

Figure 3A:
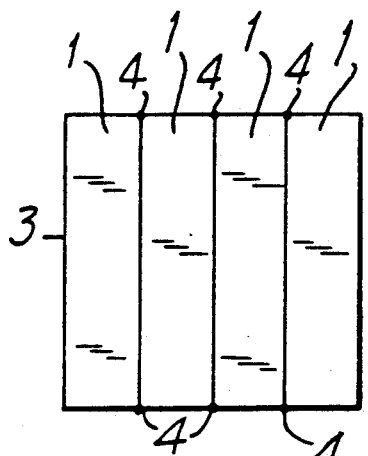
FIG. 3a shows a composite article produced by four flat products welded together.

FIG. 3a shows an example of the method in which the outwardly leading contact edges 4 of the flat products 1 are welded at all sides with one another. This welding process can be performed either with a suitable protective gas or in vacuum. The dead volumes remaining between the sheet profiles must be evacuated after the welding process or filled with such a gas which during subsequent diffusion welding process dissolves in the material without damaging.

Figure 3B:
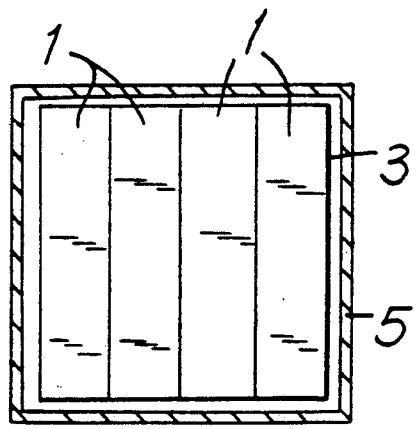
FIG. 3b shows the article of FIG. 3a surrounded by a sleeve.

FIG. 3b shows another example in which the whole composite article 3 is inserted in a gas tight and deformable sleeve 5 similarly as it is done during a hot isostatic pressing of powders or during powder forging.

Figure 4:
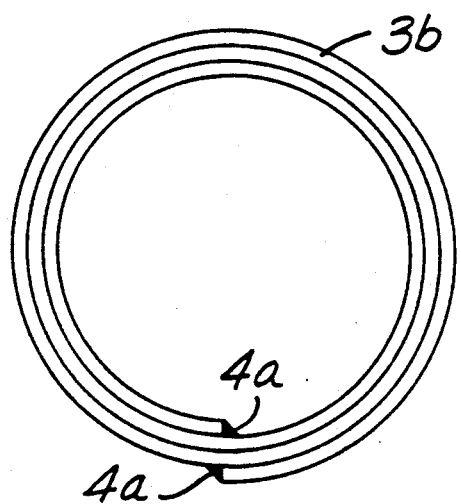
FIG. 4 shows a ring body wound from a metal strip.

FIG. 4 shows a manufacture of a ring 3b from a flat product, which is wound in several layers to a part with desired inner and outer diameters. The flat product was preliminarily nitrided in a heat treatment furnace. For this purpose it is brought in a loosely wound form in the oven for facilitating the entrance of the nitrogen-containing atmosphere for example in form of the forming gas. The start and end edges of the coil are gas tightly welded with welding seams 4a relative to the abutting winding. The same is true for the spiral shaped end-side connecting edges of the individual windings which is not shown in the drawings. Instead of the windings of a flat product, such a ring can be composed of a sequence of concentric rings arranged in one another. Diffusion welding, the coil is inserted in a gas tight sleeve, in which the coil windings are diffusion welded hot isostatically to form a compact ring body. Alternatively, such a coil can be rolled under protective gas in a ring rolling mechanism to form a compact ring. Non-rotation symmetrical structural elements can be forged in a forging die.

It can be especially interesting to assemble the composite layer materials from different sheet materials. Therefore a diffusion welded workpiece with local properties can be produced, which is favorable for special applications. This is achieved either in that the sheets are used with different basic alloy composition or sheets with the same base composition are alloyed with different metalloid content.

For this purpose, a metalloid for example nitrogen can be used in different concentrations for the individual layers. On the other hand, the metalloids including nitrogen, boron and carbon can be combined in an arbitrary manner.

It is to be understood that also sheets of different thicknesses can be diffusion welded with one another. With the same nitrogen treatment this can lead for example to different concentration profiles in the sheets.

A further advantage of this process is its "Near Net Shape" nature. For producing the later shape, the sheet profiles can be assembled with different thicknesses and design shapes to bundles. They are provided for reaching of the end form after the diffusion welding process with a minimum of post-treatment.

The method in accordance with the present invention possesses high advantages over the melt and powder metallurgy. When compared with the melt metallurgy, the process of the present invention together with the powder metallurgy eliminates all disadvantages which can occur during the solidification of a metal alloy such as segregation, bubbling, porosity and undesirable separations. As compared with the powder metallurgy, the inventive process possesses the decisive advantage in that the large inner surfaces which are formed by the outer grain surfaces and which due to their dirtying for example by oxidation can lead to a decrease in ductility, are reduced in a significant degree. If segregations are formed in the inventive process on the contact surfaces of two sheet profiles they are locally limited and can not influence the ductility. Moreover, the rolling structure impressed on the sheets additionally influences the workpiece properties of the thusly build laminate in a favorable manner.

EXAMPLE 1

A 4 mm sheet of a 13% chromium steel is annealed in a forming gas atmosphere (92% nitrogen, rest hydrogen) during 24 hours. Starting from an initial content of 0.07 weight percent nitrogen, the nitrogen content thereafter amounts in the interior 0.13 weight percent and in the surface 0.38 weight percent. If 20 such sheets are assembled in a bundle and pressed hot isostatically in a gas tight sleeve filled with nitrogen, under normal pressure during 4 hours at 1,150° C., a massive composite article is produced. It is composed of a sequence of zones with increased and low strength, and exhibits a favorable ductile property in addition to its total strength, in that fractures due to the sequence of alternating mechanical zones are stopped.

EXAMPLE 2

For producing a retaining ring of chromium-manganese-nitrogen-steel with the extended end sizes with an outer diameter 790 mm, an inner diameter 550 mm, a height of 600 mm in accordance with the inventive process the following is performed:

A steel molten in an electrolyte arc furnace is produced with the following content:

| | |
|---|---|
| Carbon: | 0.09 weight percent |
| Silicium: | 0.45 weight percent |
| Manganese: | 18.90 weight percent |
| Chromium: | 18.30 weight percent |
| Nickel: | 0.47 weight percent |
| Nitrogen: | 0.48 weight percent |

A 6-ton block is cast from the steel and rolled to a band with a thickness of 3 mm. This band is subsequently edge-planed to a width of 610 mm and pickled. The band has a tensile strength of 767 N/mm$^2$ in the rolling condition.

The band is then continuously nitriled to a nitrogen content of 1.17% in a heat treatment furnace in nitrogen-containing atmosphere (forming gas). With this nitrogen content the tensile strength is increased to 1,225 N/mm$^2$. The thusly hardened band is wound to a coil which has the end contours of retaining ring with a small excess. The initial and end edges of the thusly wound coil are welded and the same is done to the spiral shaped end-side connecting edges of the individual windings.

The coil is then introduced into hot isostatic press and diffusion welded to form a compact ring body during a time of 4 hours at 1,150° C. and a gas pressure (argon gas) of 1,000 bar. The ring body is then worked to final size. Tests taken over the width of the ring show that the strength values lie completely uniform in a region of 1,223–1,229 N/mm$^2$, which completely corresponds to the initial value of the pre-band with 1,225 N/mm$^2$. An anisotropy of the material properties over the width of the ring could not be detected.

A second retaining ring produced in the above described manner is additionally cold expanded for obtaining higher strength after the hot isostatic pressing. The strength of the ring is increased to 1,690 N/mm$^2$. Higher strength increases up to 2,000 N/mm$^2$ are possible by stronger cold expansions.

Basically, the ring can be produced in accordance with the present invention for example without cold expansion. In other words, the extended strength values can be adjusted only by the nitrogen treatments. It is to be understood that also during this operation the methods of the cold expansion provide for a possibility to correct the end strength upwardly.

It will be understood that each of the elements described above, or two or more together, may also find a useful application in other types of methods differing from the types described above.

While the invention has been illustrated and described as embodied in a method of producing a high strength and hard metal composite layer materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of manufacturing high strength and hard metallic composite layer materials by connecting several metal layers with one another, comprising the steps of forming the metal layers as flat products by rolling from a metal with low base strength, alloying and hardening the flat products over their whole cross-section with metalloid selected from the group consisting of nitrogen, boron and carbon, by treatment in a metalloid containing gas atmosphere, thereafter connecting the flat products with one another by diffusion welding.

2. A method as defined in claim 1, wherein the heat treatment in the metalloid containing gas atmosphere is performed so that over the cross-section of the flat products a concentration gradient profile is obtained, wherein the surfaces of the flat products contain a higher metalloid concentration than the interior of the flat products.

3. A method as defined in claim 1, wherein the alloying includes using nitrogen as the metalloid and introducing the nitrogen by a nitriding treatment in a nitrogen containing gas atmosphere at temperatures of 500°–1,300° C. over a time of 0.5–30 hours to a content of 0.1–3.0 weight percent nitrogen in the flat products.

4. A method as defined in claim 1, wherein the alloying includes using boron as the metalloid, and introducing boron in a boron-halide containing gas atmosphere at a temperature of 800°–1,100° C. over a time of 0.1–15 hours to a content of 0.02–0.20 weight percent boron in the flat products.

5. A method as defined in claim 1, wherein the alloying includes using carbon as metalloid, and introducing carbon in an atmosphere containing at least one gas selected from the group consisting of CO and $CH_4$ over a time of 0.5–50 hours at temperatures of 800°–1,300° C.
to a content of 0.1–2.0 weight percent carbon in the flat products.

6. A method as defined in claim 1, wherein the diffusion welding includes diffusion welding the metalloid containing flat products by hot isostatic pressing to form a compact metallic composite layer body.

7. A method as defined in claim 6, and further comprising prior to the hot isostatic pressing the steps of welding the flat product layers with one another on their contact edges, thereby forming a gas tight seal and then filling the remaining dead volumes between the flat products layers with a gas, which is soluble in the material during the hot isostatic pressing process, said gas being identical to the gas used for introducing the metalloid in the flat products.

8. A method as defined in claim 6, and further comprising prior to the hot isostatic pressing the steps of providing a deformable sleeve which surrounds the flat products layers, thereby forming a gas tight seal, and then filling the remaining dead volumes between the sleeve and the flat product layers with a gas, which is soluble in the material, during the hot isostatic pressing process, said gas being identical to the gas used for introducing the metalloid in the flat products.

9. A method as defined in claim 1, and for manufacturing a high strength tensile cylindrical metallic ring body, further comprising the steps of forming a metal band of small thickness by rolling from a metal with low base strength, alloying and hardening the metal band with a metalloid to the desired strength by a thermal treatment in a metalloid containing gas atmosphere, winding the metal band to a coil corresponding to the contours of the ring body, thereafter diffusion welding the windings of the coil hot isostatically with one another to form a compact ring body.

10. A method as defined in claim 9, and for manufacturing a high strength steel retaining ring for generators, further comprising the steps of forming a steel band of 2 to 5 mm thickness with a strength of 720 to 830N/mm$^3$ by rolling from a steel with the following composition

| | |
|---|---|
| carbon | max 0.12 weight percent |
| silicon | 0.2–1.0 weight percent |
| manganese | 17.5–20.5 weight percent |
| chromium | 17.5–20.5 weight percent |
| nickel | max 1.0 weight percent |
| nitrogen | max 0.6 weight percent, |
| iron | balance | alloying the steel band with nitrogen to nitrogen contents of 0.6 to 1.5 weight percent by a heat treatment in nitrogen containing atmosphere to raise the strength of the steel band to 800 to 2,000N/mm$^2$, winding the steel band to a coil corresponding to the end contours of the retaining ring, thereafter diffusion welding the windings of the coil hot isostatically with one another to form a compact high strength retaining ring.

* * * * *